US005239279A

United States Patent [19]

[11] Patent Number: 5,239,279

[45] Date of Patent: Aug. 24, 1993

Turunen et al.

[54] CERAMIC DUPLEX FILTER

[75] Inventors: Aimo Turunen; Pauli Nappa, both of Oulu, Finland

[73] Assignee: Lk-Products Oy, Kempele, Finland

[21] Appl. No.: 861,079

[22] Filed: Mar. 31, 1992

[30] Foreign Application Priority Data

Apr. 12, 1991 [FI] Finland ................................ 911796

[51] Int. Cl.[5] ........................ H01P 1/205; H04B 1/48

[52] U.S. Cl. .................................... 333/134; 333/206; 455/82

[58] Field of Search ............... 333/126, 132, 134, 202, 333/206, 207, 222; 455/78-83

[56] References Cited

U.S. PATENT DOCUMENTS

| | | | |
|---|---|---|---|
| 4,028,652 | 6/1977 | Wakino et al. | 333/83 |
| 4,255,729 | 3/1981 | Fukasawa et al. | 333/202 |
| 4,423,396 | 12/1983 | Makimoto et al. | 333/204 |
| 4,431,977 | 2/1984 | Sokola et al. | 333/206 |
| 4,559,508 | 12/1985 | Nishikawa et al. | 333/202 |
| 4,692,726 | 9/1987 | Green et al. | 333/206 |
| 4,703,291 | 10/1987 | Nishikawa et al. | 333/202 |
| 4,716,391 | 12/1987 | Moutrie et al. | 333/206 |
| 4,740,765 | 4/1988 | Ishikawa et al. | 333/206 |
| 4,742,562 | 5/1988 | Kommrusch | 333/206 X |
| 4,761,624 | 8/1988 | Igarashi et al. | 333/206 |
| 4,800,347 | 1/1989 | Yorita et al. | 333/202 |
| 4,800,348 | 1/1989 | Rosar et al. | 333/202 |
| 4,821,006 | 4/1989 | Ishikawa et al. | 333/202 |
| 4,823,098 | 4/1989 | DeMuro et al. | 333/206 |
| 4,829,274 | 5/1989 | Green et al. | 333/202 |
| 4,879,533 | 11/1989 | de Muro et al. | 333/206 |
| 4,896,124 | 1/1990 | Schwent | 333/206 |
| 4,954,796 | 9/1990 | Green et al. | 333/206 |
| 4,965,537 | 10/1990 | Kommrusch | 33/202 |
| 5,097,236 | 3/1992 | Wakino et al. | 333/175 |
| 5,103,197 | 4/1992 | Turunen et al. | 333/206 |
| 5,109,536 | 4/1992 | Kommrusch | 333/134 X |

FOREIGN PATENT DOCUMENTS

| | | | |
|---|---|---|---|
| 0208424 | 1/1987 | European Pat. Off. . | |
| 0401839 | 12/1990 | European Pat. Off. | 333/206 |
| 114503 | 7/1983 | Japan . | |
| 216601 | 10/1985 | Japan . | |
| 101902 | 6/1986 | Japan . | |
| 161806 | 7/1986 | Japan . | |
| 120703 | 6/1987 | Japan . | |
| 311801 | 12/1988 | Japan . | |
| 312701 | 12/1988 | Japan . | |
| 53601 | 3/1989 | Japan . | |
| 60006 | 3/1989 | Japan . | |
| 2184608 | 6/1987 | United Kingdom . | |
| 2234398 | 1/1991 | United Kingdom . | |
| 2234399 | 1/1991 | United Kingdom . | |
| 2236432 | 4/1991 | United Kingdom . | |

OTHER PUBLICATIONS

Matthaei et al., *Microwave Filters, Impedance—Mathing Networks and Coupling Structures*, McGraw-Hill, pp. 497-506 & 733-737 (1964).

Nagle, *High Frequency Diversity Receiver From the 1930's, Ham Radio, pp. 34-43 (Apr. 1990).*

Patent Abstracts of Japan-vol. 14, No. 297, (E-945) 27 Jun. 1990 & JP-A-2-094 901 (Toko Inc.) 5 Apr. 1990.

Patent Abstracts of Japan—vol. 7, No. 292 (E-219)(1437) 27 Dec. 1983 & JP-A-58-168 302 (Fujitsu K.K.) 4 Oct. 1983.

Patent Abstracts of Japan—vol. 5, No. 11 (E-42)(683) 23 Jan. 1981 & JP-A-55 141 802 (Alps Denki K.K.) 6 Nov. 1980.

Patent Abstracts of Japan—vol. 12, No. 106 (E-14 596)(2953) 6 Apr. 1988 & JP-A-62 235 801 (Fuji Electrochem Co. Ltd.) 16 Oct. 1987.

*Primary Examiner*—Robert J. Pascal
*Assistant Examiner*—Seung Ham
*Attorney, Agent, or Firm*—Darby & Darby

[57] ABSTRACT

Previously it was not possible to realize a ceramic duplex filter using a single monolithic ceramic block, because the isolation between the transmitter branch and the receiver branch could not be made sufficiently high. A duplex filter (1) can be realized in a single ceramic block by making, between its filters (A and B), a strip-like area (9) on the non-coated surface (5) of the ceramic block, due to which the electric and magnetic coupling between the resonators ($R_4$, $T_1$) of filters (A and B) on each side of the area can be adjusted to almost zero. This "electric partition" (9) provides a sufficient isolation between the filters of each branch.

17 Claims, 1 Drawing Sheet

FIG. 1
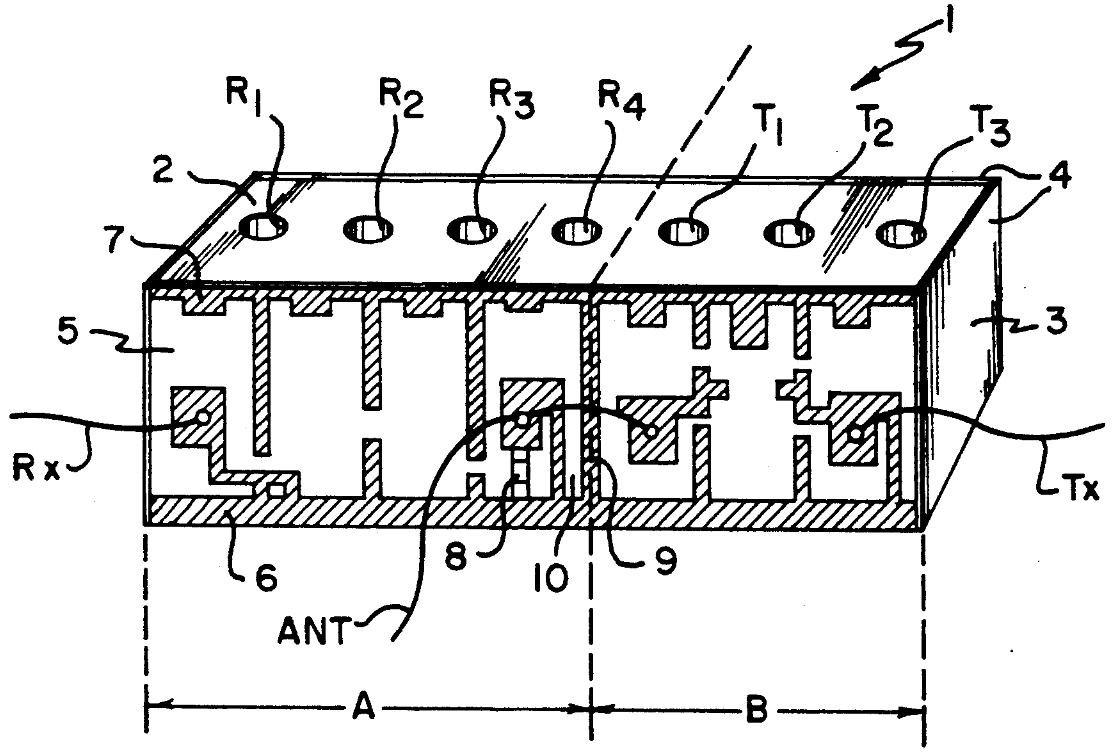
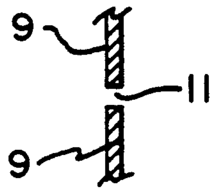
FIG. 2

CERAMIC DUPLEX FILTER

BACKGROUND OF THE INVENTION

The invention is a duplex filter comprising two ceramic band-pass filters or band-stop filters, or a combination of these filters Both filters have a body of dielectric material with top, bottom and side surfaces, whereby at least the main part of the body is coated with an electrically conductive layer, several holes extending from the top surface to the bottom surface and coated with a conductive material, each hole forming a transmission line resonator, and connecting means for the connection to the resonators.

Radio equipment having both a transmitter and a receiver which use the same antenna, require a transmission network in order to correctly control both the transmission signal and the receiving signal. The signal from the antenna must be directed to the receiver without any substantial interference from the transmitter. Accordingly the signal from the transmitter must be transmitted to the antenna without interference from the receiver. Generally a duplex filter is used for this purpose. It comprises two individual band-pass filters, one being connected in the receiving branch and having a center frequency and a bandwidth corresponding to the receiving band, the other filter being connected in the transmission branch and having a center frequency and a bandwidth corresponding to the transmission band. Often the other ends of the filters are connected through a transmission line to the common antenna line. While the duplex filter often is located in a common housing with interfaces for the transmitter, the receiver and to the antenna, in practice however it will be formed by two individual band-pass filters, because a very high isolation between the filters must be obtained so that their mutual electromagnetic leaks do not interfere with the operation. This is rather easily arranged with filters designed according to the helix technique, because it is possible to place between each filter a metallic partition, which effectively provides the required isolation. On the other hand, heretofore it was not possible to realize a duplex filter made by ceramic techniques in one monolithic ceramic body, because it was not possible to totally avoid the inductive coupling through the ceramic body. In practice it was done so that first the transmission branch band-pass filter and the receiving branch band-pass filter were made separately, each thus having interfaces for the antenna and for the receiver/transmitter. The ceramic bodies of both filters are coated with a conductive layer on the side surfaces and on the bottom surface. The finished filters are soldered onto a common support, that may be a board, a frame, or the like. At the same time the ceramic bodies are mutually fixed by soldering at the end faces. Soldering is possible, because the outer surfaces of the ceramic bodies are coated. The antenna interfaces are joined into one interface, and so a duplex filter is obtained, virtually comprising a single block.

The advantage of the known duplex filter comprising two separate ceramic blocks is a very good isolation between the filter branches, due to the conductive partition between the blocks formed by the coating of each block. On the other hand there is a disadvantage in that the ceramic blocks of each branch must be individually processed, coated and provided with electric connections in order to have the connections to the resonators. Thereafter the finished individual units are mechanically connected. The electrical and mechanical connection of the blocks is a cumbersome and slow operation. In other words, the production capacity must be doubled compared to a situation where it would be possible to make the whole duplex filter in a single ceramic block.

The Finnish patent applications FI-892855 and FI-892856, applicant LK-Products Oy, describe band-pass filters realized in a single ceramic block, where the basis of the inventive idea is that one side surface of the filter is substantially uncoated and that strip conductor patterns are applied on this side surface in order to have the connections to the transmission line resonators. When the circuit patterns are made on the side surface of the body, the filter input and output and the connections between the resonators can be made in a desired way, either purely capacitive or inductive, or as a combination of these. It is also possible to connect block components and inductance wires to the circuit patterns of this side surface, which act on the resonators and on their mutual coupling. This side surface is finally covered with a conductive cover, whereby the ceramic block is entirely enclosed by conductive material.

SUMMARY OF THE INVENTION

The objective of this invention is to provide a duplex filter, obviating the disadvantages of the above described known duplex filters and offering the possibility to be realized in a single ceramic block comprising several resonators. The invention is based on the development of the resonator circuits in the above mentioned FI-applications.

Unexpectedly it was found that by making a conductive area, a coating, in a suitable way between the resonator circuits on the uncoated side surface of the filter block, the electric and magnetic coupling between the resonators on each side of this conductive area can be adjusted close to zero. When this conductive area is made in the form of a strip extending from the ceramic block bottom surface, where it is in contact with the conductive coating of the block, up to the upper surface of the side, an almost perfect electric and magnetic isolation between the resonators is obtained. This electric "partition" is made at a suitable location on the side surface of the ceramic block comprising several resonators, whereby it provides an effective isolation between the resonator groups separated by it. One of the resonator groups forms the band-pass filter of the Rx-branch, and the other group forms the band-pass filter of the Tx-branch. The conductive area according to the invention provides in a sense an electric "partition" between the filter branches. When the individual filters are interconnected in the Rx-branch and in the Tx-branch, it is preferred to use the same principle as in the FI-applications 892856 and 892855, i.e. to use a circuit pattern located on the side of the filter and made with a mask. It is also possible to connect block components and inductance wires to the circuit patterns. When the conductive area has the height equal to that of the side wall, the antenna interface can be made at the first resonator adjacent the partition in the first filter, and from this interface an insulated conductor is extended over the conductive area to the first resonator adjacent the partition in the second filter. Finally this whole side may be covered with a conductive cover, whereby the ceramic block containing two individual filters is substantially covered by a conductive layer on all sides.

BRIEF DESCRIPTION OF THE DRAWING

The invention is illustrated with reference to the enclosed figure showing a duplex filter realized using a single monolithic ceramic block.

FIG. 1 is a perspective view of the front elevation, top plan and side elevation of a duplex filter in accordance with the invention.

FIG. 2 is a front plan view of a modification of a conductive strip of FIG. 1.

DESCRIPTION OF THE PREFERRED EMBODIMENT

The duplex filter 1 according to the invention is based on a single monolithic ceramic block with parallel holes $R_1$, $R_2$, $R_3$, $R_4$ and $T_1$, $T_2$, $T_3$ extending from the top surface 2 to the bottom surface. All surfaces of the block, except the top surface 2 and the side wall 5 shown in the figure, are entirely coated with an electrically conductive material 4. The internal side walls of the holes are also coated, these coatings joining the bottom coating. Thus in a known way 7 transmission line resonators are formed. The interface to the resonators is accomplished through circuit patterns on the side 5 made with a mask, the circuit patterns being formed by conductive areas having a defined form. These circuit patterns form e.g. the conductive areas illustrated in the figure by slanted lines, the areas having conductive area patterns 7 at the top and conductive area patterns 6 at the bottom. The pattern includes contact spots, where connections are made for the signal wire ANT to the antenna, for the conductor Rx to the receiver and for the conductor Tx to the transmitter. When needed, block components can also be used; for example the antenna contact spot is connected to the transmission line, but also through the block capacitor 8 to the circuit area strip at the bottom side edge. These circuit patterns are only intended to illustrate the use of circuit patterns on the side surface 5 of the ceramic block. Their number, size, and characteristics, and the possible discrete components, will vary according to the characteristics which are desired for the filter and according to the method with which it is realized, and as such they do not have any essential significance for the invention. Their manufacturing and influence on the coupling between the resonators is described in more detail in the above mentioned FI-applications 892855 and 892856, and thus it is not necessary to describe in further detail the provision of the patterns with the aid of a mask.

The core of the invention lies in the conductive strip 9, which in the figure extends from the conductive area at the lower edge of the side 5 to the conductive area adjacent the upper edge, and which is located exactly between the resonators $R_4$ and $T_1$ in the sense of being located between projections of these resonators onto the side 5. Surprisingly it was found, that this strip 9 causes the capacitive and the inductive coupling to cancel each other out, in other words the coupling between the resonators will be almost zero. In a sense an "electric partition" is formed between the resonators. Due to this two separate filters are formed in the same monolithic ceramic block: the filter A comprising the resonators $R_1$, $R_2$, $R_3$, $R_4$, and the filter B, comprising the resonators $T_1$, $T_2$, $T_3$. Filter A is the band-pass filter of the receiver branch, and filter B is the band-pass filter of the transmitter branch. While these filters are on the same ceramic block, they do not interfere with the operation of the other filter, because the electric partition according to the invention provides an almost complete isolation between them. The only connection between them is the jumper connection 10 that connects the transmitter branch filter to the antenna interface. Finally the side wall, 5 containing the circuit patterns and the interfaces, is covered with a conductive cover, whereby the ceramic block is substantially entirely enclosed by a conductive layer.

A duplex filter in a single ceramic block can be realized with the aid of the strip-like conductive area according to the invention between the resonators, because the isolation required by the filter operation is easily achieved. Then the duplex filter can be made in a single process, while until now two separate filters were manufactured, which then later were interconnected. Savings in production costs are substantial. A single ceramic block has a further advantage in that a mechanically strong duplex filter is obtained.

Earlier it was mentioned that the conductive area providing the electrical partition is a continuous strip extending from the lower surface of the side to the upper surface. The width of this strip has an influence of the separation provided by the electric partition, and thus it is possible to obtain a desired value of coupling between the resonators by varying its width. However, this is not the only alternative. The conductive strip could have an interruption or discontinuity 11 (See FIG. 2), a non-conductive area of a defined length. This interruption is preferably closer to the lower edge of the side 5, where the inductive coupling is at its highest. The interruption enables the realization of the strip 9 as a strip line directly on the wall surface. This interruption also has an effect on the coupling between adjacent resonators $R_4$ and $T_1$ of the filters A and B. Thus within the scope of the claims it is possible to adjust the coupling by varying the form of the conductive area and its discontinuities.

We claim:

1. A ceramic duplex filter, comprising:

a single monolithic ceramic block having a first elongated filter for connection to a receiver branch and a second elongated filter for connection to a transmitter branch, said first elongated filter block having a first plurality of resonators including a first resonator, said second elongated filter block having a second plurality of resonators including a last resonator, each of the resonators being composed of a portion of dielectric material having top, bottom and at least two side surfaces with a respective hole extending from said top surface to said bottom surface, the first resonator of said first plurality of resonators of said first elongated filter and said last resonator of said second plurality of resonators of said second elongated filter being neighboring resonators which are adjacent each other along a dividing line, the top, bottom and at least a first of the side surfaces being generally covered with an electrically conducting material, a second of the side surfaces being at most partially covered with electrically conductive material; and conductive strip means for substantially cancelling out electric and magnetic fields between said neighboring resonators, said conductive strip means including at least one conductive strip located along the dividing line on the second side surface and extending generally straightly between the conductive material on the top and bottom surfaces, said conductive strip being elongated in a direction parallel to a direction of elongation of the resonator hole.

2. A filter as in claim 1, wherein said conductive strip is discontinuous, whereby the length of the discontinuity affects the coupling between said neighboring resonators.

3. A filter as in claim 1, wherein said conductive strip is narrower than necessary to cancel the electric and magnetic field between the neighboring resonators, whereby the width of the conductive strip means affects the coupling between the neighboring resonators.

4. A filter as in claim 1, wherein said one side surface has interface means and circuit patterns for connections to said resonators.

5. A filter as in claim 1, wherein an electrically conductive coating at least partly covers the top, bottom and side surfaces.

6. A filter as in claim 4, wherein the circuit patterns include isolated spots of conductive material on the same side surface, said isolated spots each being aligned generally with the mid point of the hole of an associated one of the resonators, the circuit patterns also including surrounding conductive material located around the edges of the same side surface on which is located the conductive strip means, and capacitive elements connecting the spots and the surrounding conductive material.

7. A filter as in claim 6, wherein the connecting means include inductive elements connecting the spots, an input lead connected to one of the spots of an associated one of the resonators and an output lead connected to another of the spots associated with another of the resonators.

8. A ceramic duplex filter, comprising:

a single monolithic ceramic block having a first elongated filter for connection to a receiver branch and a second elongated filter for connection to a transmitter branch, said first elongated filter block having a first plurality of resonators including a first resonator, said second elongated filter block having a second plurality of resonators including a last resonator, each of the resonators being composed of a portion of dielectric material having top, bottom and at least two side surfaces with a respective hole extending from said top surface to said bottom surface, the first resonator of said first plurality of resonators of said first elongated filter and said last resonator of said second plurality of resonators of said second elongated filter being neighboring resonators, the top, bottom and at least a first of the side surfaces being generally covered with an electrically conducting material, a second of the side surfaces being at most partially covered with electrically conductive material; and conductive strip means for affecting coupling between said neighboring resonators, said second side surface having respective locations which coincide with projections of said holes onto said second side surface, said conductive strip means being located between and spaced from said respective locations, said conductive strip means including at least one conductive strip extending generally straightly from the top edge to the bottom edge of said second side surface and which is elongated in a direction perpendicular to a direction of elongation of said top and bottom edges, said conductive strip means having a discontinuity whose length affects the coupling between said neighboring resonators.

9. A filter as in claim 8, wherein each of said first and second elongated filters have filter circuit patterns and connecting means for connecting a signal to the filter circuit patterns, for coupling said signal to said neighboring resonators, and for outputting a signal from the filter circuit patterns.

10. A filter as in claim 8, wherein said one side surface has interface means and circuit patterns for connections to said resonators.

11. A filter as in claim 8, wherein an electrically conductive coating at least partly covers the top, bottom and side surfaces.

12. A ceramic duplex filter, comprising:

a single monolithic ceramic block having a first elongated filter for connection to a receiver branch and a second elongated filter for connection to a transmitter branch, said first elongated filter block having a first plurality of resonators including a first resonator, said second elongated filter block having a second plurality of resonators including a last resonator, each of the resonators being composed of a portion of dielectric material having top, bottom and at least two side surfaces with a respective hole extending from said top surface to said bottom surface, the first resonator of said first plurality of resonators of said first elongated filter and said last resonator of said second plurality of resonators of said second elongated filter being neighboring resonators, the top, bottom and at least a first of the side surfaces being generally covered with an electrically conducting material, a second of the side surfaces being at most partially covered with electrically conductive material; and conductive strip means for affecting coupling between said neighboring resonators, said second side surface having respective locations which coincide with projections of said holes onto said second side surface, said conductive strip means being arranged spaced from and between said respective locations, said conductive strip means including at least one conductive strip extending generally straightly from the top edge to the bottom edge and which is elongated in a direction perpendicular to a direction of elongation of said top and bottom edges, said conductive strip means including a conductive strip that has a width which affects the coupling between said neighboring resonators and being narrower than that necessary for cancelling an electric and magnetic field between said neighboring resonators.

13. A filter as in claim 12, wherein said one side surface has interface means and circuit patterns for connections to said resonators.

14. A filter as in claim 12, wherein an electrically conductive coating at least partly covers the top, bottom and side surfaces.

15. A filter as in claim 12, wherein said first and second elongated filters have filter circuit patterns and connecting means for connecting a signal to the filter circuit patterns, for coupling said signal to said neighboring resonators, and for outputting a signal from the filter circuit patterns.

16. A ceramic duplex filter, comprising:

a single monolithic ceramic block having a first elongated filter for connection to a receiver branch and a second elongated filter for connection to a transmitter branch, said first elongated filter block having a first plurality of resonators including a first resonator, said second elongated filter block having a second plurality of resonators including a last resonator, each of the resonators being composed of a portion of dielectric material having top, bottom and at least two side surfaces with a respective hole extending from said top surface to said bottom surface, the first resonator of said first plurality of resonators of said first elongated filter and said last resonator of said second plurality of resonators of said second elongated filter being neighboring resonators, the top, bottom and at least a first of the side surfaces being generally covered with an electrically conducting material, a second of the side surfaces being at most partially covered with electrically conductive material; and conductive strip means for substantially cancelling out electric and magnetic fields between said neighboring resonators, said second side surface having respective locations which coincide with projections of said holes onto said second side surface, said conductive strip means being located between and spaced from said respective locations, said conductive strip means including at least one conductive strip extending generally straightly from the top edge to the bottom edge of said second side surface and which is elongated in a direction perpendicular to a direction of elongation of said top and bottom edges, said conductive strip means having a discontinuity whose length affects the coupling between said neighboring resonators elongation of said top and bottom edges.

17. A filter as in claim 16, wherein said first and second elongated filters each have filter circuit patterns and connecting means for connecting a signal to the filter circuit patterns, for coupling said signal to said neighboring resonators, and for outputting a signal from the filter circuit patterns.

* * * * *